Dec. 20, 1960 R. MATTHEWS ET AL 2,965,849
DEMODULATORS
Filed Dec. 12, 1955
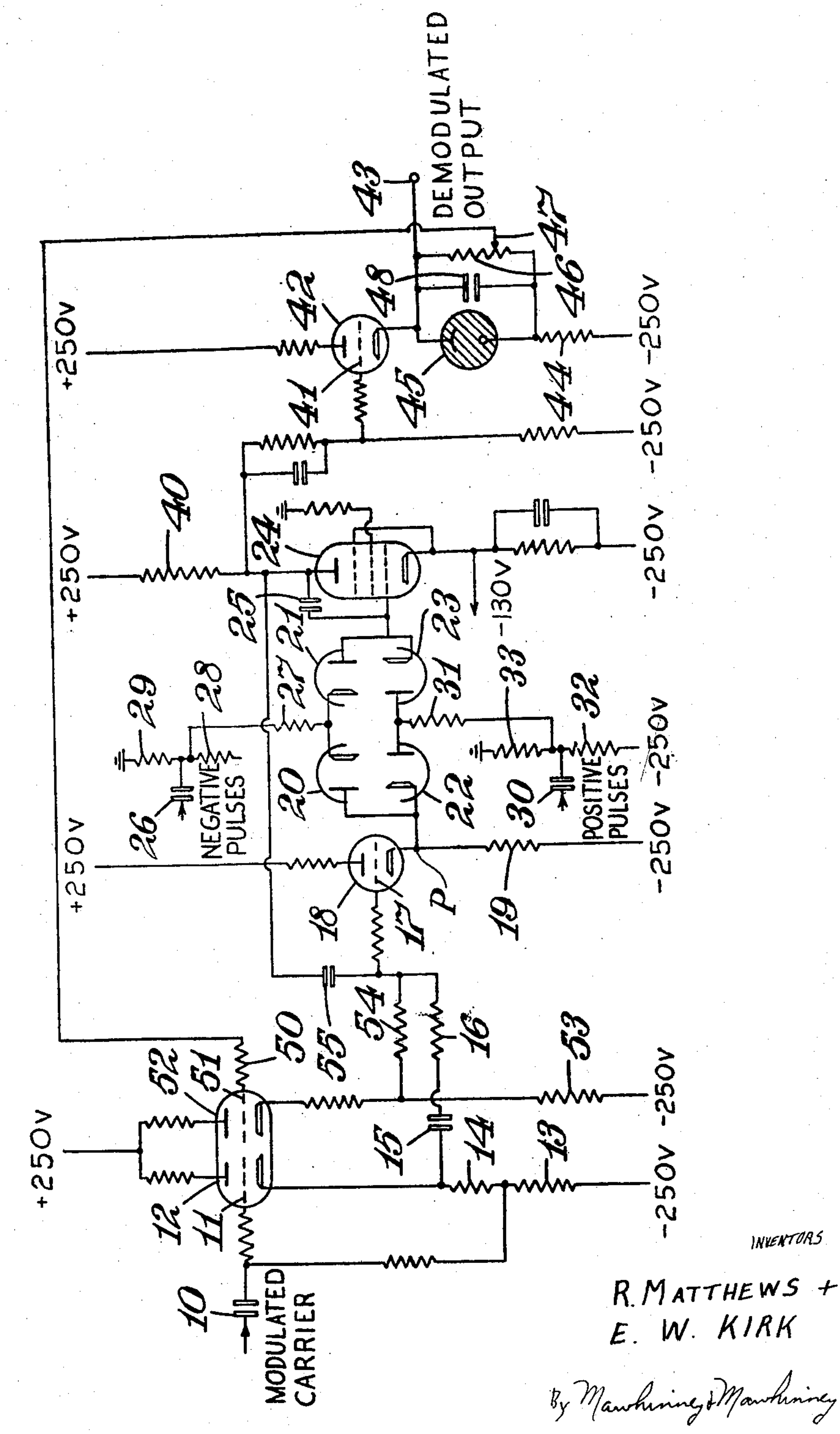
INVENTORS
R. MATTHEWS + E. W. KIRK
By Mawhinney & Mawhinney United States Patent Office 2,965,849

Patented Dec. 20, 1960

2,965,849

DEMODULATORS

Robert Matthews and Eric William Kirk, London, England, assignors to The Decca Record Company Limited, London, England, a British company Filed Dec. 12, 1955, Ser. No. 552,587

Claims priority, application Great Britain Dec. 7, 1955

11 Claims. (Cl. 329—104)

This invention relates to demodulators for demodulating a modulated carried by pulse sampling the modulated signal at short intervals of time corresponding to the same phase of the cycles of carrier frequency and by integrating the resultant sampled pulses.

Such a demodulator is described, for example, in British specification No. 679,723 and, as described in that specification, the demodulator has particular application to the scanning of plan position indicator displays for radar systems. With prior demodulators of this kind, accuracy of integration has only been achieved at the expense of slowness in response to changes in the modulation amplitude. This is because, with a simple form of integrator, accuracy of integration is obtained by making the time constant very long but such a long time constant inherently causes slowness in response to sudden chanegs in the modulation amplitude. Therefore, for example, such arrangements are not suitable for radar plan position indicators in which the time base is scanned in a manner known as $\pi$ sweeping, that is to say indicators in which the trace is swept through a sector of 180 degrees and then immediately started again at the beginning of that sector.

It is an object of the present invention to provide a demodulator of the kind described above in which accurate integration can be obtained whilst still achieving a rapid response to changes in the modulation amplitude.

According to this invention, a demodulator for demodulating a modulated carrier by pulse sampling the modulated signal at short intervals of time corresponding to the same phase of the cycles of the carrier frequency and by integrating the resultant sampled pulses is characterised by having a valve integrator circuit with an integrating capactiy and a switching arrangement for altering a resistance in the integrating circuit so that during the sampling pulses there is a lower impedance to changes in the charge in the integrating capacity than there is during the intervals between the sampling pu'ses. By this arrangement the time constant of the integrating circuit can be made very large and may be substantially infinite during the intervals between the pulses but can be made sufficiently small during the pulses to permit of rapid change in the charge in the integrating capacity when such a change is required.

The valve integrator, which conveniently is a Miller integrator, may be provided with a feed-back circu't for feeding the demodulated output back to be mixed with the input of the integrator to keep the sum of the input and output at the instants of occurrence of the sampling pulses constant. Separate feed-back circuits for direct and alternating components may be provided. The feed-back circuit for the direct components is preferably arranged to include as much of the circuit of the demodulator as possible and, for example, if there are amplifier stages before and after the integrator, the feed-back circuit may be arranged to feed back the output frcm the output amplifier to the input to the input amplifier. Feed back of alternating components and in particular steep waveforms may be desirable to prevent overshooting and also to prevent sudden changes in the integrator output, such as occurs, for example, in $\pi$ sweeping, from affecting the performance of the demodulator, For this latter reason the alternating current feed-back can sometimes be taken directly from the integrator even if an output amplifier is provided.

In order to drive the integrator equally positively and negatively, the aforementioned switching arrangement may comprise a pair of switches operated respectively by positive and negative pulses, one switch being effective when the sampled potential is below the potential at the integrator input and the other being effective when the sampled potential is above the potential at the integraor. Each switch may comprise a pair of rectifiers connected in series back to back between the source of sampled potential and the integrator input, the switch operating pulse for each switch being applied to the junction of the rectifiers; the rectifiers of the two switches must have their polarities such that one pair is made conductive by a positive operating pulse and the other pair by a connective operating pulse. The four rectifiers would thus be arranged in the manner of a bridge rectifier circuit.

The following is a description of one embodiment of the invention, reference being made to the accompanying drawing which is a circuit diagram of a demodulator for demodulating a modulated carrier by pulse samp'ing the modulator signal at short intervals of time corresponding to the same phase of the cycles of the carrier frequency and by integrating the resultant sampled pulses.

Referring to the drawing, the modulated carirer is applied trough a condenser 10 to the grid 11 of one triode section 12 of a double triode valve forming part of a cathode follower and mixer stage where, as described later, the input signal is mixed with feedback signals. The triode section 12 is connected as a cathode follower and its output is developed across a cathode load resistance comprising resistors 13, 14. This output is fed through a condenser 15 and resistor 16 to the grid 17 of a further cathode follower valve 18, the output of which is developed across a cathode resistor 19. The potential at the cathode end of this resistor 19, that is to say at the point marked P, forms the sampled potential and this point will therefore hereinafter be referred to as the sampling point. This sampling point is connected to an electronic switch which consists of two pairs of rectifiers 20, 21 and 22, 23. As is shown in the drawing the two rectifiers 20, 21 are connected in series back to back with their cathodes connected together, whereas the two rectifiers 22, 23 are connected in series back to back with their anodes connected together. The anode of rectifier 20 and the cathode of rectifier 22 are connected to the sampling point P and the anode of rectifier 21 and the cathode of rectifier 22 are connected to the control grid of a pentode amplifier valve 24. This valve 24 is arranged as a Miller integrator with integrating capacity 25 connected between the anode and the control grid.

Negative going switch control pulses are applied through a condenser 26 and a resistor 27 to the cathodes of rectifiers 20 and 21; in the absence of switch control pulses, these two rectifiers are maintained non-conductive by a bias potential from a potentiometer 28, 29. Simultaneously with the negative going control pulses for rectifiers 20, 21, positive going switch control pulses are app!ied through a condenser 30 and a resistor 31 to the anodes of rectifiers 22 and 23, these two rectifiers being biased, in the absence of switch control pulses, so as to be non-conducting by a bias potential from a potentiometer 32, 33. The two sets of switch control pulses are synchronised with the modulated carrier frequency so as to occur once in each cycle of the carrier wave. Preferably the pulses occur at the peaks of the carrier wave cycles since the maximum variation of amplitude, due to the modulation, occurs at the peaks but this is not essential. For example in the case of a sine wave a modulation may be detected whatever the phase of the pulses provided the pulses are not exactly in phase quadrature with the peaks of the cycles.

The output from the integrating valve 24, developed across an anode load resistor 40, is applied to the control grid 41 of a triode valve 42 forming a further cathode follower stage from which the required demodulated output is obtained at terminal 43. The cathode circuit of the valve 42 includes a resistor 44 and a gas filled diode 45, the latter being shunted by a tapped potentiometer 46 and a condenser 48. The diode 45 forms a constant voltage device which maintains a constant voltage across the potentiometer 46. The datum level of this voltage depends, however, on the current drawn by valve 42. This potentiometer 46 has an adjustable tap 47 from which a direct feed-back potential is obtained. It will be seen that this network in the cathode circuit of valve 42 can provide a direct feed-back potential which varies exactly as the potential at terminal 43 varies but at a different datum level. The gas-filled diode 45 has a low impedance at very low frequencies and so extends the low frequency and direct current response of the feed-back loop.

The direct feed-back potential from the adjustable tap 47 is applied through a resistor 50 to the control grid 51 of the second triode section 52 of the afore-mentioned double triode valve. This direct feed-back potential therefore controls the current through the triode portion 52 and hence the potential developed across a cathode load resistor 53, which latter potential is applied to the aforementioned grid 13 of valve 18 through a resistor 54.

The alternating potential feed-back is derived from the anode of valve 24 and is applied through a blocking condenser 55 to the grid of triode 18.

The resistor 54 and the resistor 16, through which the signal from the triode portion 12 is fed to the grid 17 of valve 18, are provided to prevent the low impedances at the cathodes of the triode portions 12 and 52 being presented to the alternating potential feed-back which is also applied to the grid 17 of valve 18 and also to prevent these low impedances from loading the anode circuit of valve 24. These resistors 16 and 54 also prevent the low impedance of triode portion 12 from loading triode portion 52 and vice versa. Because the input impedance of valve 18 is very high, very little attenuation results from the resistors 16 and 54.

The two switches formed by the rectifiers 20, 21 and 22, 23 are both cut off, as explained above, except when the switch control pulses are applied. One switch will conduct when the sampling point P is below the potential of the input grid of the valve 24 and the other switch when the sampling point P is above the potential of the input grid of valve 24. For example, assuming that point P is at a potential below that of the input grid of valve 24, then the application of a negative pulse to the cathodes of diodes 20, 21 will cause these two diodes to conduct and hence will cause their cathode potentials to rise until they reach the anode potential of diode 20, that is to say the sampling potential, at which potential diode 20 begins to conduct so preventing any further rise. Since diode 21 is conductive, this potential is immediately applied to the grid of valve 24 and the overall effect is that a pulse is applied to the grid of valve 24 to bring that grid to the potential of the sampling point P. The impedance of the diodes, when they are conductive, is so small that the application of potential to the grid of valve 24 is practically instantaneous and thus the pulse at the grid will have the same duration as the switch control pulses. Thus for the duration of these switch control pulses, the conduction through the switches will enable the input grid of the valve 24 to become very rapidly the same as that at the sampling point P. The time constant of the integrating circuit is proportional to the anode to grid capacity of the valve 24 multiplied by the gain of the valve and multiplied by the effective resistance in the charging circuit. When the switches are cut off, this effective resistance is substantially infinite and hence the time constant is substantially infinite, but, during the pulses, the effective resistance is very small and hence the time constant is low enough to enable the charge in the integrating capacity 25 to alter rapidly. The output from the integrating valve 24, since it is fed back to the mixer stage, will tend to keep the sampling point P at a constant potential and, for this reason, the output from the integrator at terminal 43 will therefore vary as the input modulating voltage. If this modulating voltage changes rapidly, large pulses will be fed to the integrator and the output will follow rapidly due to the low impedance when the pulses are applied to the switches.

It will be noted that, in the arrangement described, separate alternating and direct potential feed-back paths are provided. These two paths may thus each be individually designed without compromise to the needs of the other. By virtue of the good frequency response characteristic that can thus be obtained, full advantage can be taken of feed-back techniques. Furthermore, by adjustment of the tap 47 in the direct potential feed-back circuit, the output level may be set correctly.

In one embodiment of the circuit arrangement shown in the drawing, using a carrier frequency of 5 kc./s. and having a sampling pulse once per cycle, the sampling pulse being of 10 microseconds' duration, it has been found possible to obtain a complete phase reversal of the modulator output in the interval between successive pulses with only a small transient overshoot lasting for two further pulses.

We claim:

1. A demodulator for demodulating a modulated carrier by pulse sampling comprising an electronic switch operated by pulses derived from said carrier and occurring at short intervals of time corresponding to the same phase of cycles of the carrier frequency, a valve integrator including an integrating capacitor in a feedback circuit of an amplifying valve and having two alternative time constant circuits with different time constants of integration, which time constant circuits are selectively coupled into said integrator by said electronic switch, said time constant circuits being arranged so that the time constant during said pulses is short compared with the duration of the pulses and that the time constant between the pulses is long compared with the interval between the pulses, an input circuit for applying said modulated carrier to said integrator, and circuit means feeding back the demodulated output to the input of the integrator to establish the amplitude level of the demodulated output with reference to the sampled signal amplitude during the sampling pulses.

2. A demodulator for demodulating a modulated carrier by pulse sampling with sampling pulses of a duration short compared with the cyclic period of said carrier, which demodulator comprises a valve integrator including an integrating capacitor in a feedback circuit of an amplifying valve and having a time constant circuit switchable to give two different alternative time constants of integration, an input circuit for applying said modulated carrier to said integrator, a pulse-operated electronic switch arranged to selectively switch the time constant circuit, means for applying to said switch operating pulses having the duration of the required sampling pulses and occurring repetitively at time intervals corresponding to the same phase of cycles of the carrier frequency, said time contact circuit being arranged so that the time constant during said pulses is short compared with the duration of the pulses and that the time constant between the pulses is long compared with the interval between the pulses, and circuit means feeding back the demodulated output to the input of the integrator to establish during the sampling pulses an amplitude level of the demodulated output corresponding to the sampled signal amplitude.

3. A demodulator as claimed in claim 2 wherein said time constant circuit comprises a common capacitive reactance in combination with two alternative resistive impedances.

4. A demodulator for demodulating a modulated carrier by pulse sampling with sampling pulses of a duration short compared with the cyclic period of said carrier, which demodulator comprises a valve integrator having an integrating capacity in a feedback circuit of an amplifying valve charged through a charging circuit, an input circuit for applying said modulated carrier to said integrator, a pulse-operated electronic switch arranged to alter the resistance in said charging circuit to reduce the impedance to changes in the charge on said capacity when a pulse is applied to the switch, means for applying to said switch operating pulses having the duration of the required sampling pulses and occurring repetitively at time intervals corresponding to the same phase of cycles of the carrier frequency, and a feed-back circuit for feeding back the demodulated output to the input of the integrator to establish during the sampling pulses an amplitude level of the demodulated output corresponding to the sampled signal amplitude.

5. A demodulator as claimed in claim 4 wherein the charging circuit is arranged so that the impedance to changes in charge of the capacity is substantially infinite during the intervals between the operating pulses.

6. A demodulator as claimed in claim 5 wherein the charging circuit is arranged so that the impedance to changes in charge of the capacity, when an operating pulse is applied to the switch, is so low that the time constant of integration is short compared with the duration of the operating pulses.

7. A demodulator for demodulating a modulated carrier by pulse sampling with sampling pulses of a duration short compared with the cyclic period of said carrier, which demodulator comprises a valve integrator having a time constant circuit including an integrating capacitor in a feedback circuit of an amplifying valve, the time constant crcuit being switchable to give two different alternative time constants of integration, an input circuit for applying said modulated carrier to said integrator, a feed-back circuit for feeding back the demodulated output to the input of the integrator, a pulse-operated electronic switch arranged selectively to switch said time constant circuit on application of operating pulses to the switch, and means for applying to said switch operating pulses having the duration of the required sampling pulses and occurring repetitively at time intervals corresponding to the same phase of cycles of the carrier frequency, said time constant circuit being arranged so that the time constant during said pulses is short compared with the duration of the pulses and that the time constant between the pulses is long compared with the interval between the pulses.

8. A demodulator for demodulating a modulated carrier by pulse sampling with sampling pulses of a duration short compared with the cyclic period of said carrier, which demodulator comprises a valve integrator having a time constant circuit including an integrating capacitor in a feed-back circuit of an amplifying valve, the time constant circuit being switchable to give two different alternative time constants of integration, an input circuit for applying said modulated carrier to said integrator, a feed-back circuit comprising separate feed-back paths for direct and alternating components for feeding back the demodulated output to the input of the integrator, a pulse-operated electronic switch arranged selectively to switch said time constant circuit on application of operating pulses to the switch, and means for applying to said switch operating pulses having the duration of the required sampling pulses and occurring repetitively at time intervals corresponding to the same phase of cycles of the carrier frequency, said time constant circuit being arranged so that the time constant during said pulses is short compared with the duration of the pulses and that the time constant between the pulses is long compared with the interval between the pulses.

9. A demodulator as claimed in claim 8 wherein there is provided an input amplifier for amplifying the input to said input circuit and an output amplifier for amplifying the output of the integrator and wherein the feed-back path for the direct components is arranged to feed-back the output from the output amplifier to the input to the input amplifier.

10. A demodulator for demodulating a modulated carrier by pulse sampling with sampling pulses of a duration short compared with the cyclic period of said carrier, which demodulator comprises a valve integrator having a time constant circuit including an integrating capacitor in a feedback circuit of an amplifying valve, the time constant circuit being switchable to give two different alternative time constants of integration, an input circuit for applying said modulated carrier to said integrator, a feed-back circuit for feeding back the demodulated output to the input of the integrator, which feed-back circuit comprises separate feed-back paths for direct and alternating components with the alternating current feed-back path being arranged to feed the output from the integrator without amplification to said input circuit, a pulse-operated electronic switch arranged selectively to switch said time constant circuit on application of operating pulses to the switch, and means for applying to said switch operating pulses having the duration of the required sampling pulses and occurring repetitively at time intervals corresponding to the same phase of cycles of the carrier frequency, said time constant circuit being arranged so that the time constant during said pulses is short compared with the duration of the pulses and that the time constant between the pulses is long compared with the interval between the pulses.

11. Pulse sampling apparatus for sampling intermittently the amplitude of an input signal comprising an electronic switch arranged to be operated for a short period when the input signal is to be sampled, a valve integrator including an integrating capacitor in a feed-back circuit of an amplifying valve having two alternative time constant circuits with different time constants of integration, which time constant circuits are selectively coupled into said integrator by said electronic switch, said time constant circuits being arranged so that the time constant during the sampling period is short compared with that period and that the time constant between the sampling periods is much longer than the time constant during the sampling periods, an input circuit for applying said input signal to said integrator, and circuit means feeding back the output of the integrator to said input circuit to establish the amplitude level of the output with reference to the sampled signal amplitude during the sampling periods.

References Cited in the file of this patent

UNITED STATES PATENTS

| | | |
|---|---|---|
| 2,388,052 | Hansell | Oct. 30, 1945 |
| 2,443,195 | Pensly | June 15, 1948 |
| 2,532,338 | Schlesinger | Dec. 5, 1950 |
| 2,639,386 | Karpeles | May 19, 1953 |
| 2,675,469 | Harker et al. | Apr. 13, 1954 |
| 2,790,903 | Kirkness et al. | Apr. 30, 1957 |

FOREIGN PATENTS

| | | |
|---|---|---|
| 679,723 | Great Britain | Sept. 24, 1952 |

OTHER REFERENCES

Chance et al.: "Waveforms," MIT Radiation Laboratory Series, vol. 19, page 664, McGraw-Hill Book Co. Inc., 1949.